No. 833,002. PATENTED OCT. 9, 1906.
F. ROBBIN.
SYSTEM OF REGULATING FLUID PRESSURES.
APPLICATION FILED JUNE 21, 1905.
2 SHEETS—SHEET 1.
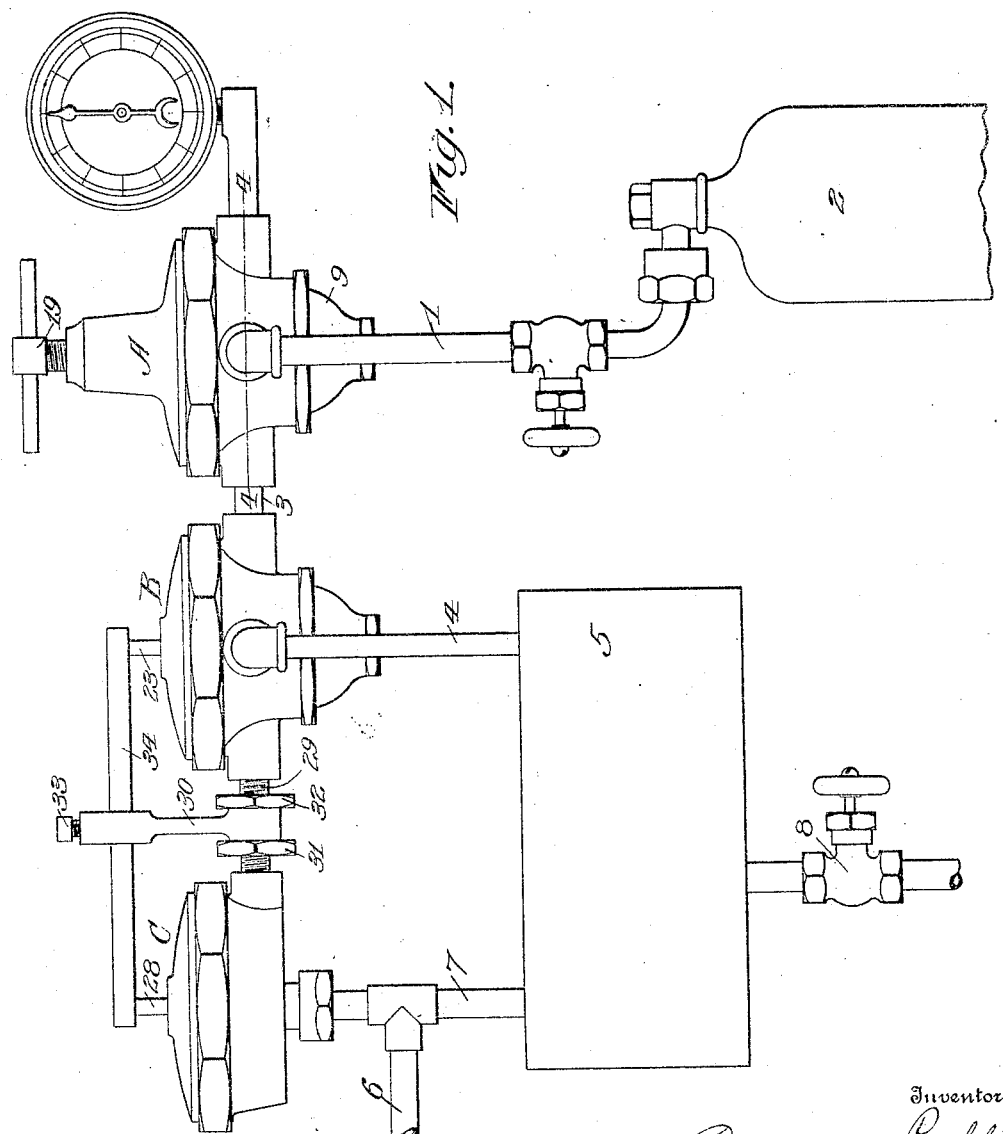

No. 833,002. PATENTED OCT. 9, 1906.
F. ROBBIN.
SYSTEM OF REGULATING FLUID PRESSURES.
APPLICATION FILED JUNE 21, 1905.
2 SHEETS—SHEET 2.
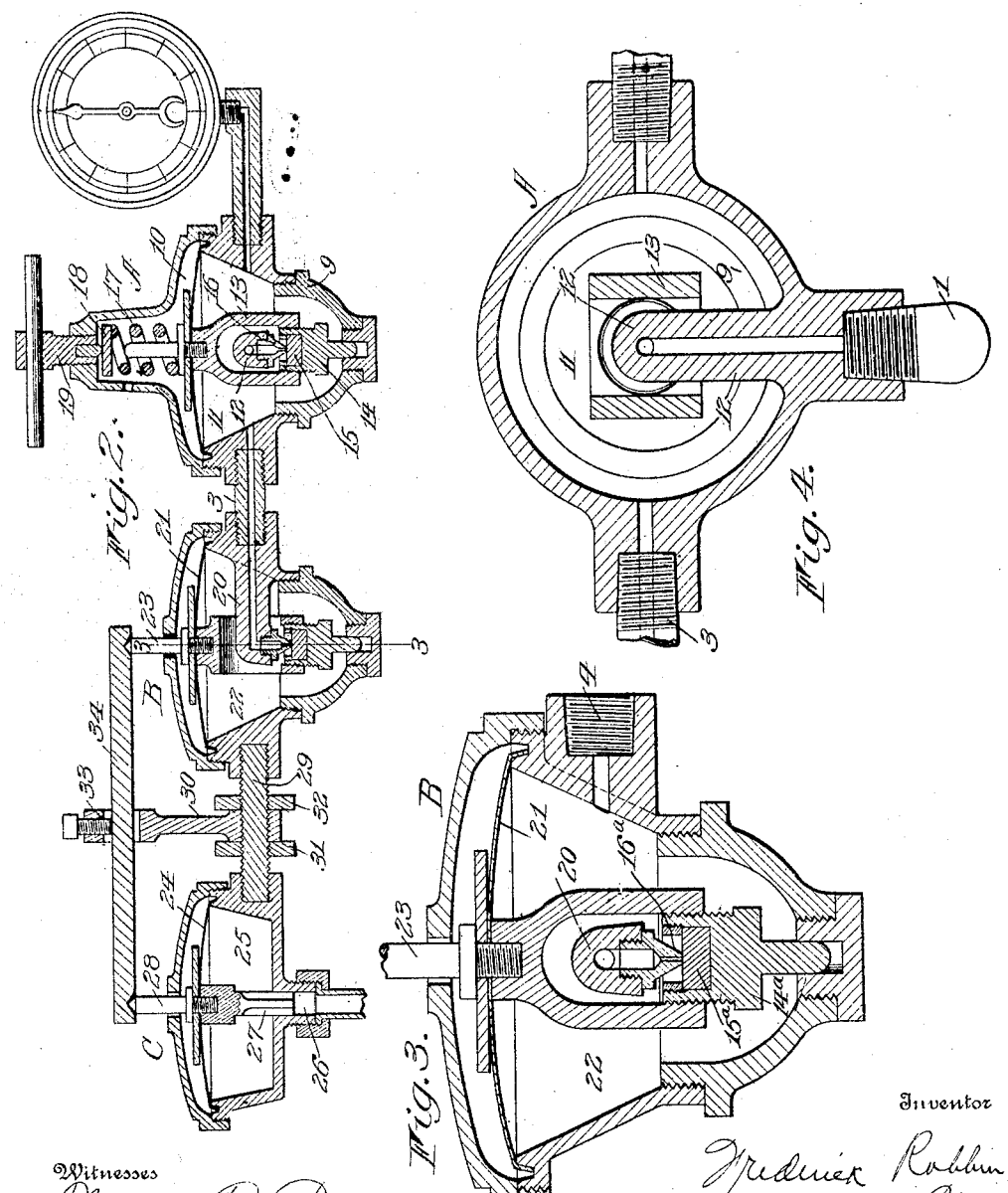
Witnesses
Walter B. Payne
Clarence A. Bateman
Inventor
Frederick Robbin
By Frederick H. Church
His Attorney

UNITED STATES PATENT OFFICE.

FREDERICK ROBBIN, OF NEW YORK, N. Y.

SYSTEM OF REGULATING FLUID-PRESSURES.

No. 833,002.

Specification of Letters Patent.

Patented Oct. 9, 1906.

Application filed June 21, 1905. Serial No. 266,265.

*To all whom it may concern:*

Be it known that I, FREDERICK ROBBIN, of New York city, in the county and State of New York, have invented certain new and useful Improvements in Systems of Regulating Fluid-Pressures; and I do hereby declare the following to be a full, clear, and exact description of the same, reference being had to the accompanying drawings, forming a part of this specification, and to the reference characters marked thereon.

This invention relates, primarily, to apparatus for mixing gas and liquid, and more particularly for carbonating water or other beverages.

It comprises an organization wherein the water-pressure and the gas at a greater pressure than that of the water act in opposition to control the supply of gas and in which the gas, stored under high pressure in the usual holders, is reduced to an approximately constant pressure and the water may be supplied from a source subject to comparatively wide variations of pressure, the apparatus being so arranged that however the water-pressure may fluctuate a desired ratio between the gas-supply and the water-supply may be substantially maintained.

The apparatus comprises also an improved regulating apparatus whereby the pressure of one fluid may be controlled by that of another.

In the drawings, Figure 1 is a diagrammatic view showing one method of connecting up a system of regulators embodying my invention. Fig. 2 is a vertical sectional view through a system of regulators embodying my invention. Fig. 3 is a vertical section on the line 3 3 of the middle regulator, Fig. 2; and Fig. 4 is a horizontal sectional view on the line 4 4 of the first regulator, Fig. 1.

In the several views, the same characters of reference designate similar parts.

My improved system of regulating or controlling fluid-pressures and the regulators employed in connection therewith is intended for use generally in all instances where it is desirable to obtain an accurate regulation of a fluid or a balance in pressure between one fluid and another, and therefore I do not limit the scope of the invention as applied to any particular use; but when employed for controlling the liquid and gas pressures in carbonating apparatus it effects a marked improvement both in the quality and uniformity of the product, as well as the automatic features which render the apparatus self-regulating and free from temperature variations and other influences, and therefore I will describe the invention as employed in such connection.

In carbonating liquids it is advantageous to connect the apparatus directly to the city-water supply when available, for this avoids the expense and inconveniences of employing special pumps for supplying the liquid to the apparatus at the requisite pressure; but the pressure of the liquid from such sources is constantly fluctuating, and unless the flow of the gas is governed so as to maintain a predetermined balance relatively to the water-pressure at every fluctuation of the latter the quality and uniformity of the carbonated liquid will vary considerably, an overbalance of either gas or liquid pressure resulting frequently in totally suspending the mixing operation and causing either pure gas or liquid to be blown out of the draft-arm. By the use of my invention these defects are cured and the carbonating process is carried on automatically, as the apparatus is self-regulating notwithstanding the changes in pressure of either the gas or liquid and is not subject to the changes in atmospheric temperature.

My invention in its present form comprises a series of regulators A, B, and C, respectively, the regulator A being connected by pipe 1 to a tank or other source of gas-supply 2 and by the tube 3 to inlet of the regulator B, the outlet 4 of the regulator B leading to a mixing-chamber 5 of any suitable construction. The pipe 6 leads from a suitable source of liquid-supply to the pipe 7, one end of the latter connecting with the regulator C and its opposite end with the chamber 5, the pipe 8 being employed for drawing off fluid from this chamber.

I do not limit myself to any particular form of regulators, but in the present embodiment the regulator A is capable of reducing the initial pressure of the gas to approximately the highest pressure attained by the liquid and delivers the gas thus reduced to the regulator B, and it comprises a casing 9, formed in several parts for convenience in manufacture and handling, the interior of the casing being divided by the flexible diaphragm 10 to form a chamber 11 at one side thereof into which the inlet 12 discharges. This inlet is controlled by a valve comprising in its present form a yoke 13, which is movable with the diaphragm and carries a cap 14, preferably adjustable thereon and having a suitable packing 15, arranged to coöperate with the nozzle 16 of the inlet, which has a small discharge-aperture therein. Pressure within the compartment 11 will tend to operate the diaphragm to close the valve; but in order to set the device so that the valve will close only when the pressure in this compartment reaches a desired point the opposite side of the diaphragm is open to the atmosphere and is acted upon by a compression-spring 17, one end of which is seated against the diaphragm, while its opposite end bears on a stop 18, the latter being adjustable by means of the screw 19, so that the spring may exert different pressures on the diaphragm tending to open the valve, and thus balance the pressure in the compartment 11.

The tube 3 conveys the gas from compartment 11 to the inlet 20 of the regulator B, discharge of gas from the inlet of this regulator being also controlled by a suitable valve, comprising, in the present instance, the cap 14ª, having a packing 15ª to coöperate with the nozzle 16ª of the inlet 20, the movable parts of the valve being carried by the yoke 13ª, which in turn is operable with the diaphragm 21, the latter forming a compartment 22, into which the inlet 20 discharges. The upper side of this diaphragm is open to the atmosphere and is provided with a stem 23, which extends upwardly through the casing, while the pipe 4 leads from the compartment 22 to the chamber 5.

The regulator C comprises a casing of suitable form, having a diaphragm 24 therein to form a compartment 25 beneath it, a passage 26 being formed in the casing for establishing communication between the liquid-supply pipe 7 and the compartment 25. A guiding-stem 27 is preferably attached to the diaphragm, having a fluted portion operating in this passage in such a way as to guide the diaphragm and still not interfere with the passage of liquid between the compartment 25 and pipe 7, and the opposite side of the diaphragm has an upwardly-extending stem 28, similar to the stem 23 of regulator B.

The regulators B and C are held in fixed relation by the threaded support 29, and on this support is mounted a fulcrum-arm 30, which is movable freely between the two regulators and is locked in adjusted position by the locking-nuts 31 and 32, mounted on the threaded support, the upper portion of the threaded support, the upper portion of the fulcrum arm being provided with a screw or fulcrum 33, which is adjustable in a direction at right angles to the adjustment for the fulcrum-arm, thus providing adjustment for the fulcrum in two directions. Bearing against this fulcrum at a point intermediate its ends is a lever 34, the ends thereof bearing, respectively, on the stems 23 and 28 of the regulators B and C, it being obvious that by such an arrangement motion of the diaphragm of regulator C, due to fluctuations of liquid-pressure, will be transmitted in proportion to the valve of regulator B, high pressure of liquid causing the stem 28 to move up, rocking the lever 34 on its fulcrum and depressing the stem 23 of regulator B to open the valve to admit a sufficient quantity of gas to balance the increased pressure of the liquid, and a decrease in liquid-pressure will in the same way allow the valve controlling the gas-supply to close or reduce the pressure of gas delivered by regulator B.

In operating a fluid-pressure-regulating system employed in the connection described and illustrated the regulator A is connected by the pipe 1 to a suitable source of gas-supply under pressure, one or more tanks 2 containing gas under initial pressure of approximately fifteen hundred pounds being generally employed in connection with carbonating apparatus, and the gas entering the first regulator discharges from the inlet 12 thereof into the compartment 11, subject to the control of the valve which is operated by the diaphragm, the latter being operated upon by the spring 17 to open the valve and retain it open until the gas admitted to the said compartment reaches such a pressure that it will operate the diaphragm in opposition to the spring, thus closing the valve to interrupt the supply of gas until the gas-pressure in the compartment beneath the diaphragm falls, and then the spring will be able to reopen the valve, and in this way a practically uniform and constant pressure is maintained in the compartment 11 of the regulator A.

From the regulator A the gas under the reduced pressure enters the compartment 22 of regulator B, under control, however, of the regulator-valve, and as this valve is arranged to close by pressure in compartment 22, acting on the diaphragm 21, and to open by pressure of the regulating fluid or liquid in chamber 25 of regulator C through the stems 23 and 28 of the regulators B and C and the rocking lever 34, connecting them, a comparatively low pressure of liquid will operate with less force on diaphragm 24 and may cause the valve of regulator B to partially open to bring the gas-pressure into balance with the liquid-pressure, and when the pressure of gas from regulator B is equal to that of the liquid the valve controlling the gas will remain closed by reason of the gas-pressure in compartment 22 of regulator B acting on the diaphragm 21. When the pressure in regulator C rises, it will operate on the lever 34 with sufficient force to overcome the opposing gas-pressure on the under side of diaphragm 21 of regulator B, causing the valve of this regulator to open and admit a sufficient flow of gas to balance that of the liquid or other fluid.

In operating a carbonating apparatus it is preferable to supply the gas to the mixing-chamber at a somewhat higher pressure than that of the liquid at all times in order that the gas will be properly forced into the liquid, and in the present construction practically any desired ratio of pressures may be maintained between the liquid and gas notwithstanding the fluctuations in pressures of the liquid, by simply shifting the fulcrum-arm 30 into the proper position between the regulators B and C. An independent adjustment is effected, and by adjusting the screw 33, which serves as a fulcrum by which the parts may be adjusted, the valve of regulator B will operate with precision at every fluctuation in pressure of the liquid or regulating fluid.

A system of fluid-pressure regulators embodying my invention is capable of being employed in various connections where it is necessary or desirable to obtain an accurate regulation of one fluid by another in order that they may balance or bear a predetermined ratio or proportion of pressure notwithstanding fluctuations that may be constantly occurring in either one or both of the sources of supply. Changes in atmospheric temperature may also occur without affecting the precision with which the regulators operate, for while expansion and contraction of the spring of regulator A due to variations in temperature will operate on the corresponding valve with varying force, resulting in variations in the pressure delivered by the first regulator, when the reduced pressure reaches regulator B expansion and contraction of the parts will occur equally, there being no spring employed. This is an important matter, as the movement of the valve while controlling the flow of the gas under high pressure is hardly perceptible, and on account of this fact regulators depending on a spring require readjustment for practically every variation in temperature, whereas by avoiding the use of a spring or similar part, as in the regulators B and C, temperature variations will have no effect on the regulation of the fluid.

I claim as my invention—

1. In means for regulating fluid-pressures, the combination with a casing, a diaphragm inclosed therein and forming a fluid-pressure compartment at one side thereof and open to the atmosphere at its opposite side, a valve inclosed within and discharging into said compartment, and arranged to be closed by fluid-pressure in said compartment acting on said diaphragm, of a second casing, a diaphragm therein adapted to be operated by fluid-pressure, and a controlling member operated by the second-mentioned diaphragm and connected to the open side of the first-mentioned diaphragm, said member normally operating to open the controlling-valve.

2. In a regulator for controlling fluid-pressures, the combination with a casing, a valve inclosed therein for controlling the discharge of fluid into the casing, and a diaphragm connected to the valve and arranged to be operated by fluid-pressure within the casing to normally close said valve, of a second casing, a diaphragm therein adapted to be operated by fluid-pressure and means connected to the second diaphragm and operating on the first-mentioned diaphragm to open said valve in the first-mentioned casing.

3. In means for regulating fluid-pressures, the combination with a pair of hollow casings supported in fixed relation, a diaphragm fitted in each casing open to the atmosphere at one side and forming a fluid-pressure compartment arranged in each casing at the side of the diaphragm opposite to that open to the atmosphere, a fluid-pressure-controlling valve inclosed within one of said compartments, operatively connected to the respective diaphragm, and through which one fluid is admitted to said compartment, and means for admitting another fluid to the other pressure-compartment, of an equalizing-lever operatively connected to those sides of both diaphragms open to the atmosphere.

4. In a system of regulating fluid-pressures, the combination with a regulator connected to a source of gas-supply and capable of maintaining a flow of gas therefrom under substantially constant pressure, of a second regulator arranged to receive the gas from the first regulator and having a controlling-valve therein, and a third regulator connected to a source of liquid-supply under fluctuating pressures, having a part therein operated by the fluctuations of pressure in the liquid-supply and operating on the valve of the second regulator for controlling the flow of gas therefrom.

5. Apparatus for charging water, supplied under variable pressure, with carbonic-acid gas, comprising the combination of pressure-reducing means for delivering gas at approximately constant pressure in excess of the maximum water-pressure from a holder in which it is contained under higher pressure; a regulator to which the gas is delivered at such approximately constant pressure, comprising a gas-supply valve adapted to be closed by the pressure of the gas supplied to the regulator by said valve; and means whereby the variable pressure of the water is caused to act upon said valve in opposition to pressure of the gas.

6. Apparatus for charging water, supplied under variable pressure, with carbonic-acid gas, comprising the combination of pressure-reducing means for delivering gas at an approximately constant pressure in excess of the maximum water-pressure from a holder in which it is contained under higher pressure; a regulator to which the gas is delivered at such approximately constant pressure, comprising a gas-supply valve adapted to be closed solely by the pressure of the gas supplied to the regulator by said valve; and means whereby the variable pressure of the water is caused to act upon said valve in one direction only and in opposition to pressure of the gas.

FREDERICK ROBBIN.

Witnesses:
  JAY LEHRBACH,
  M. M. CORWIN.